United States Patent
Nacu, Jr. et al.

(10) Patent No.: US 12,124,986 B2
(45) Date of Patent: Oct. 22, 2024

(54) REAL-TIME ANALYTICS AND INTERFACES

(71) Applicant: NCR Voyix Corporation, Atlanta, GA (US)

(72) Inventors: Rodolfo Nacu, Jr., Cebu (PH); Chario Bardoquillo Maxilom, Ibabao Cordova (PH); Juhnie Ann Pastoriza, Andres Abellana Extension Guadalupe (PH)

(73) Assignee: NCR Voyix Corporation, Atlanta, GA (US)

( * ) Notice: Subject to any disclaimer, the term of this patent is extended or adjusted under 35 U.S.C. 154(b) by 640 days.

(21) Appl. No.: 16/023,003

(22) Filed: Jun. 29, 2018

(65) Prior Publication Data

US 2020/0005210 A1      Jan. 2, 2020

(51) Int. Cl.
  *G06Q 10/0639* (2023.01)
  *G06F 16/2455* (2019.01)
  *G06N 20/00* (2019.01)
  *G06Q 30/0201* (2023.01)

(52) U.S. Cl.
CPC .. *G06Q 10/06393* (2013.01); *G06F 16/24568* (2019.01); *G06N 20/00* (2019.01); *G06Q 30/0201* (2013.01)

(58) Field of Classification Search
CPC .. G06Q 30/02; G06Q 10/06; G06Q 10/06393; G06Q 50/01; G06Q 50/184; G06Q 10/1057; G06Q 10/10; H04N 21/2668; H04M 15/8061
See application file for complete search history.

(56) References Cited

U.S. PATENT DOCUMENTS

| | | | | |
|---|---|---|---|---|
| 2005/0096963 A1* | 5/2005 | Myr | ............... | G06Q 30/0206 705/7.35 |
| 2016/0162910 A1* | 6/2016 | Pradhan | ............ | G06Q 30/0201 705/7.23 |
| 2016/0342929 A1* | 11/2016 | Tanaka | ............ | G06Q 10/06314 |

FOREIGN PATENT DOCUMENTS

WO    WO-2019231466 A1 *  12/2019  ......... G06K 9/00288

OTHER PUBLICATIONS

M. Yesudas, et al. "Intelligent operational dashboards for smarter commerce using big data," in IBM Journal of Research and Development, vol. 58, No. 5/6, pp. 13:1-13:10, Sep.-Nov. 2014, doi: 10.1147/JRD.2014.2346131 <https://ieeexplore.ieee.org/document/6964872/metrics#metrics> (Year: 2014).*

* cited by examiner

*Primary Examiner* — Jerry O'Connor
*Assistant Examiner* — Michael R Koester
(74) *Attorney, Agent, or Firm* — Schwegman Lundberg & Woessner, P.A.

(57) ABSTRACT

A fine-grain analytics engine and a report/notification interface are provided. The fine-grain analytics engine is configured to be customized configured for fine-grain projections and metrics generation for operations of an enterprise. The report/notification interface provides an Application Programming Interface (API) and an interactive graphical display interface for reporting and integrating the projections and metrics generated by the fine-grain analytics engine into enterprise services and enterprise devices.

18 Claims, 4 Drawing Sheets

REAL-TIME ANALYTICS AND INTERFACES

BACKGROUND

Timely delivered analytics can make a significant difference on the bottom-line of any organization. For example, during the holiday season, the ability for a retailer to maximize customer checkout throughput and expedite long customer lines at checkout stations are critical because the quicker customers can be checked out, the more customers who have not yet purchased will be willing to purchase because the lines are shorter, and the sales can be consummated more quickly.

This can also be even more important during shortened holiday seasons. Retailers experience at least thirty percent of their entire annual sales in the holiday season that begins at Thanksgiving and ends at Christmas. The retailers need to have a sufficient number of cashiers to man checkout stations and need to be operating efficiently in order to maximize the holiday season.

A variety of analytic solutions exist to manage sales and provide staffing projections but few if any are able to adequately account for shortened time periods in a real-time fashion. Most provide a level of granularity that is based on a month or a week. A week is insufficient during a shortened holiday season. Moreover, the holiday season can be so busy that the level of granularity may need to be intervals of time within a single day. No analytic solutions provide a fine-grain level of analysis that is intra-day.

The retail market is becoming hyper competitive and many retailers are unable to survive in such an environment. Some long-standing companies that have been around for decades are closing stores and laying off staff. As a result, enterprises are relying more and more analytics in attempt to distinguish themselves over the competition and maximize enterprise profit and efficiencies.

SUMMARY

In various embodiments, methods and a system for fine-grain analytics and interfaces are presented.

According to an embodiment, a method for fine-grain analytics and interfaces is presented. Specifically, and in one embodiment, an interface is provided to an analytics engine. Fine-grain configuration information, received through the interface is delivered by the interface to the analytics engine. The analytics engine gathers historical and real-time data and the analytics engine generates results consistent with the fine-grain configuration information. Finally, the results are delivered within the interface.

DETAILED DESCRIPTION

Figure 1:
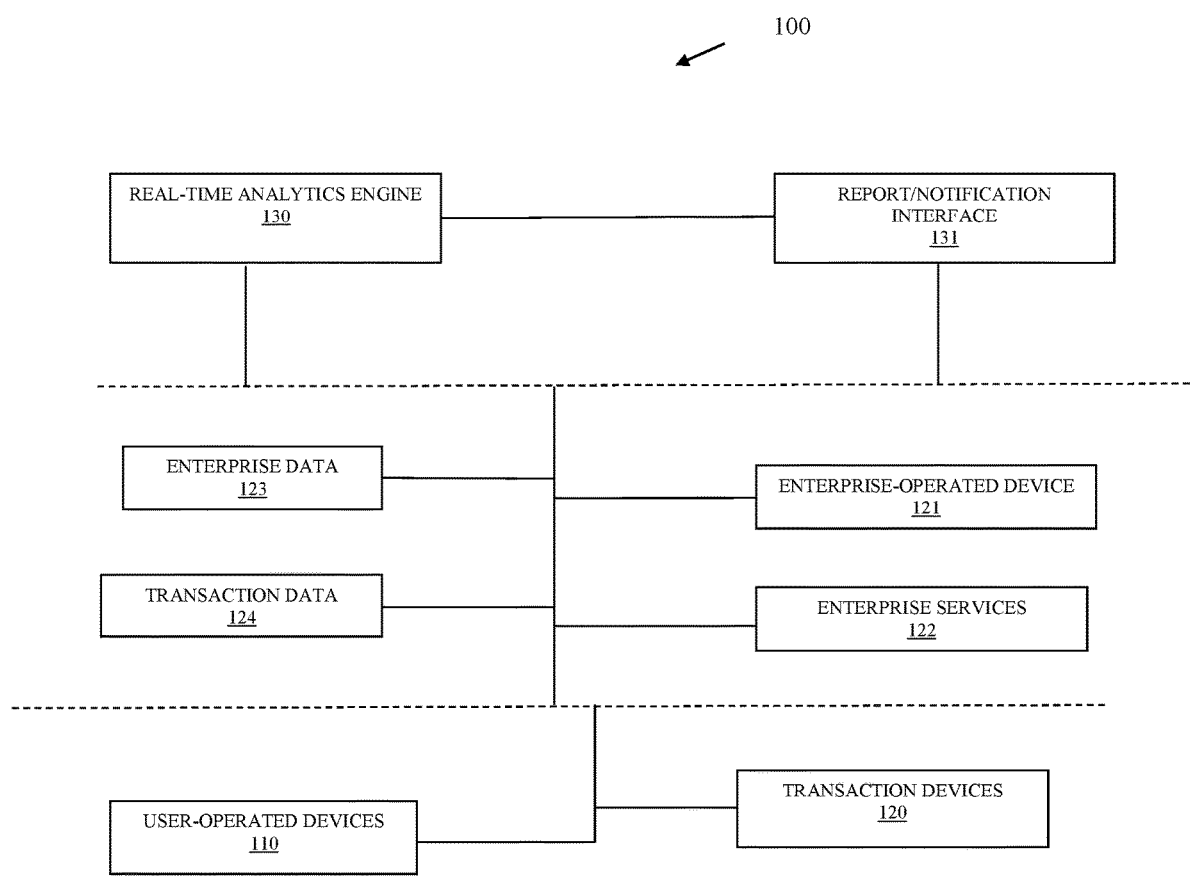
FIG. 1 is a diagram of a system for fine-grain analytics and interfaces, according to an example embodiment.

FIG. 1 is a diagram of a system 100 for fine-grain analytics and interfaces, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of a fine-grain analytics and interfaces, presented herein and below.

The system 100 includes a plurality of user-operated devices 110, transaction devices 120, enterprise-operated devices 121, enterprise services 122, enterprise data 123, transaction data 124, a real-time analytics engine 130, and a report/notification interface 131.

The user-operated devices 110 include: phones, tablets, laptops, desktops, wearable processing devices, and the like.

The transaction devices 120 include: Self-Service Terminals (SSTs), Point-Of-Sale (POS) terminals, and web-based servers.

The enterprise-operated devices 110 include: servers, desktops, laptops, wearable processing devices, phones, tablets, and the like.

The enterprise services 122 reside on enterprise-based servers and/or cloud-based servers.

The real-time analytics engine 130 and the report/notification interface 131 reside on servers and/or cloud-based servers.

The user-operated devices 110, transaction devices 120, the enterprise-operated devices 121, the enterprise services 122, the real-time analytics engine 130, and the report/notification interface 131 are networked together over wide-area networks (WANs) and/or local area networks (LANs) through wired and wireless network communications with custom-defined access mechanisms and security enforced for such communications.

The enterprise captures transaction data 124 for transactions processed on the transaction devices 120 with users/consumers. The transactions can be processed in-person or over a web-based connection between a user-operated device 110 and a transaction device 120. The transaction data 124 includes by way of example only: a consumer identifier, a consumer loyalty account, calendar date, day of week, time of day, items purchased or returned in the transaction, item descriptions, item price information, item quantity for the transaction, any cashier identifier for a cashier, transaction terminal identifier, enterprise location/store identifier, method of payment provided for the transaction, and the like.

Some of the enterprise services 122 capture and create enterprise data 123. The enterprise data 122 can include, by way of example only: staff identifiers, inventory data, work staffing/schedules, asset data, maintenance logs for equipment of the enterprise, security and access permissions for staffing, revenue information, expense information, profit information, organizational information, employee data, promotional data, item pricing and description data, supplier data, distributor data, holiday data, and the like.

The analytics engine 130 receives real-time transaction data captured by the transaction devices 120 and includes an Application Programming Interface (API) for accessing the enterprise data 123 and the transaction data 124 for all historical transaction information of the enterprise.

The enterprise-operated devices 121 are provided the report/notification interface 131 for configuring some aspects of the processing associated with the analytics engine 130. In an embodiment, the report/notification engine 131 is a web-based interface accessible to the enterprise-operated devices 121 via a browser application that executes on the enterprise-operated devices 121. In an embodiment, the report/notification engine 131 includes an API for interacting automatically with the enterprise services 122.

The configuration of the analytics engine 130 provided through the interface 131 can detail fine-grain requests for staffing projections that can be requested in increments as low as 15 minute intervals. The staffing projections can request to obtain a projected number of transaction terminals 120 that should be manned in each 15 minute interval on a given day of operation for the enterprise.

In an embodiment, the analytics engine 130 processes a weighted regression algorithm to analyze the real-time collected transaction data, the historical transaction data 124, and the enterprise data 123 to provide the staffing projections for the transaction terminals 120 on a given data within a given interval of time.

In an embodiment, the analytics engine 130 calculates the staffing projections for a given day during a given interval of time by obtaining from the transaction data 124 historical transactions metrics for previous transactions on the given day and the given interval of time. The given day can be a holiday, such that the historical transaction data 124 is obtained for the past holiday on their actual day (i.e., Thanksgiving falls on different calendar days in every calendar year (last Thursday of the month of November, which does vary from year to year). Furthermore, if the given day is a day that follows a holiday or precedes a holiday, the analytics engine 130 is able to account for this, such that the historical day and the given day vary year over year. The volume of transactions and the items associated with the transactions from the historical transaction data 124 is obtained.

Continuing with the previous embodiment, the enterprise data 123 is accessed to obtain existing enterprise projected growth or decrease in sales for the current calendar year, month, and/or holiday schedule. The volume of transactions and the projected sales volume is then combined with all the remaining associated transaction data 124 and linear regression is processed to identify portions of the data 124 and 123 that have a stronger effect on transaction volume that other portions of the data 124 and 123. This can also be done through a machine learning process in which past projected sales are altered by the actual experienced sales noted in the enterprise data 123 over years of operation for the enterprise, such that an algorithm can be derived and dynamically trained and adjusted to identify portions of the data 124 and 123 that have a higher correlation in successfully projecting the transaction volume on any given day and interval of time during that day. The analytics engine 130, in this way, maintains an algorithm for providing a day and intra-day transaction volume project with weighted factors (portions of the data 124 and 123). This algorithm can be adjusted further based on the existing transaction volume for the current year, month, week, and current day of the enterprise in view of the enterprise data 123 projected transaction volume for the year, month, and week. That is, if projected volumes are running short by 10% of the actual volumes the machine-learning algorithm of the analytics engine 130 accounts for this in the algorithm. The algorithm takes as input a total number of transaction terminals 120 for the enterprise at a given store, the desired calendar period (month, week, day) and the desired interval of time (hour, half hour, 15 minutes, etc.). The output of the machine learning algorithm is a total number of transaction terminals 120 that need to be staffed within the enterprise to handle the expected volume of transactions on the desired calendar period and interval of time.

The staffing projections for manning the transaction terminals 120 is provided from the analytics engine 130 to the enterprise-operated devices 121 and enterprise services 122 through the report/notification interface 131. In an embodiment, an API of the report/notification interface 131 provides the staffing projections for display within an existing interfaces associated with the enterprise services 122, such as within a dashboard widget. In an embodiment, the report/notification interface 131 provides the staffing projects within an interactive graphical display that graphs the staffing projections in the desired interval of time for the given calendar period. The graph representing a rendered instance of the interface 131 and is interactive such that a user can click on the graph to obtain finer-grain detail (such as projected idle number of transaction terminals 120, employees scheduled to work available for transaction terminal 120 assignments, previous years staffing at that interval of time, previous total transactions at that interval of time, and the like). The interactive graph interface 131 can also permit changing of the interval of time and/or calendar period by the user. Such changes are provided from the interface 131 to the analytics engine 130 for real-time modification to the staffing projections and the graphed interface instance 131. Furthermore, based on existing real-time collected transaction data 120, the analytics engine 130 is continually updating the staffing projections and providing such changes through the interface 131. For example, suppose the transaction data reveals a substantial short fall from the initial staffing projections for the transaction terminals 120, the analytics engine 130 is able to detect this in real time and determine based on threshold settings that the previous staffing projections require updating. Also, because the analytics engine 130 is a machine-learning algorithm as actual transaction volumes are provided through the real-time collected transaction data 124, the algorithm's weights and factors are dynamically adjusted so that the algorithm becomes more accurate and precise in provided the staffing projections. In this manner, the analytics engine 130 learns the trends of the enterprise and determines more important factors associated with projecting accurate and precise staffing projections.

The real-time analytics engine 130 also provides separate machine learning algorithms for identifying a variety of other useful information to the enterprise for assisting not only in the efficiencies of the enterprise by for maximizing enterprise revenue and customer satisfaction.

For example, the real-time analytics engine 130 can identifying a priority ordered list of specific products or items that are mostly likely to be sold on any given calendar day (accounting for holiday schedules). For instance hot dogs can be identified as a top selling product three days before July $4^{th}$. Because a machine-learning algorithm is dynamically maintained and adjusted by the real-time analytics engine 130, this can reveal a hot item that becomes a trend as well so that the enterprise is able to properly adjust its inventory of such an item in advance of running out of stock for that item.

Still further, the real-time analytics engine 130 can maintain a machine-learning algorithm for commonly used forms of payments on given days within given time intervals. This information may permit the enterprise to identify that on every Friday or on the middle or end of a month, consumers are paying more frequently with cash than with credit cards, or that consumers are paying by checks more frequently, of that consumers are using a specific credit card more frequently than different available credit cards. This may allow the enterprise to adjust promotions geared toward encouraging or discouraging specific methods of payment provided by the customer, or allow the enterprise to approach a specific credit card financial institution for establishing a mutually beneficial relationship (such as receiving a lessened fee from such financial institution in exchange for offering promotions to encourage the customers to use the financial institutions credit card or receive such lessened fee based on sales volumes of the enterprise with the credit card). This information may also allow the enterprise to adjust maintenance schedules for card readers based on the projected use of credit card payments versus cash or check.

The real-time analytics engine 130 can also maintain a machine learning algorithm for performance metrics and behaviors of enterprise operator's behavior while operating the transaction terminals 120. For example, some operators are more efficient than other operators based on items handled and total transaction times for transactions, some operators are less productive in the morning than other operators, some operators are less productive in the evening than other operators, a particular operator has less efficiency on a specific transaction terminal 120, etc. The enterprise can then adjust specific operator assignments to transaction terminals based on the results provided by the real-time analytics engine 130.

The real-time analytics engine 130 can also maintain a machine-learning algorithm for customer personalization and for promotion generation. For example, a given customer's transaction history reveals a pattern of buying specific products within a given interval of time (e.g., once a week), a customer is identified in real-time conducting a transaction at a transaction terminal 120 where the item purchased information is gathered and provided in real time to the real-time analytics engine 130. Milk and eggs are missing from the transaction but are typically purchased every week by the customer and the transaction has just ended. The real-time analytics engine 130 through the interface 131 uses an API to notify a customer-facing service 122 of the enterprise and a text message is dynamically sent to a registered mobile device of the customer indicating we noticed that you typically buy eggs and milk every week and did not purchase such items in this transaction. The notification can also be directly displayed on a SST display at the conclusion of the transaction and/or printed on a receipt for the transaction. The customer is satisfied because the customer is reminded of items that the customer forgot to purchase and the enterprise is satisfied because the customer is likely going to go back and buy the milks and eggs from the enterprise.

Another machine-learning algorithm can use the transaction data and the enterprise data for suggesting promotions on specific products to the enterprise on specific days or calendar intervals to increase sales of such products or to encourage sales of such items to reduce existing overstocked inventors of such products.

The interface 131 uses APIs to integrate into the existing enterprise services 122 and provides its own reporting and configuration interface to the real-time analytics engine 130. The reports can be interactive graphs that can be adjusted and exposes user-defined levels of detailed information based on selections and user-interaction with the graphs. The APIs permit projections and real-time metrics to be delivered from the real-time analytics engine 130 to existing enterprise services 122, such as customer notifications via transaction terminal displays and user/customer-operated devices 110, enterprise-operated device displays (dashboard widgets, etc.).

It is to be noted that the real-time analytics engine 130 has access to the enterprise data 123, which includes holiday schedules, such that any desired day of projection can be readily resolved by the real-time analytics engine 130 to correspond to a date that is near or on a given holiday and associated that desired day with historical days that are similarly situated. Furthermore, any desired day identified within a holiday season (Thanksgiving through Christmas) can be readily identified by the real-time analytics engine 130. Holiday dates vary such that accounting for holiday dates are of import when providing the machine-learning algorithm for projections by the real-time analytics engine 130.

One now appreciates how a real-time analytics engine 130 combined with a report/notification interface 131 can be easily integrated into an existing enterprises data sources (123 and 124), devices (121 and 120), enterprise services 122, and even user-operated devices 110 (through existing enterprise services 122) for purposes of providing fine-grain enterprise projections, promotions, and customer-reminder services in real time. The level of projections can be as fine-grain as 15 minute intervals for a single day.

These and other embodiments are now discussed with reference to the FIGS. 2-4.

Figure 2:
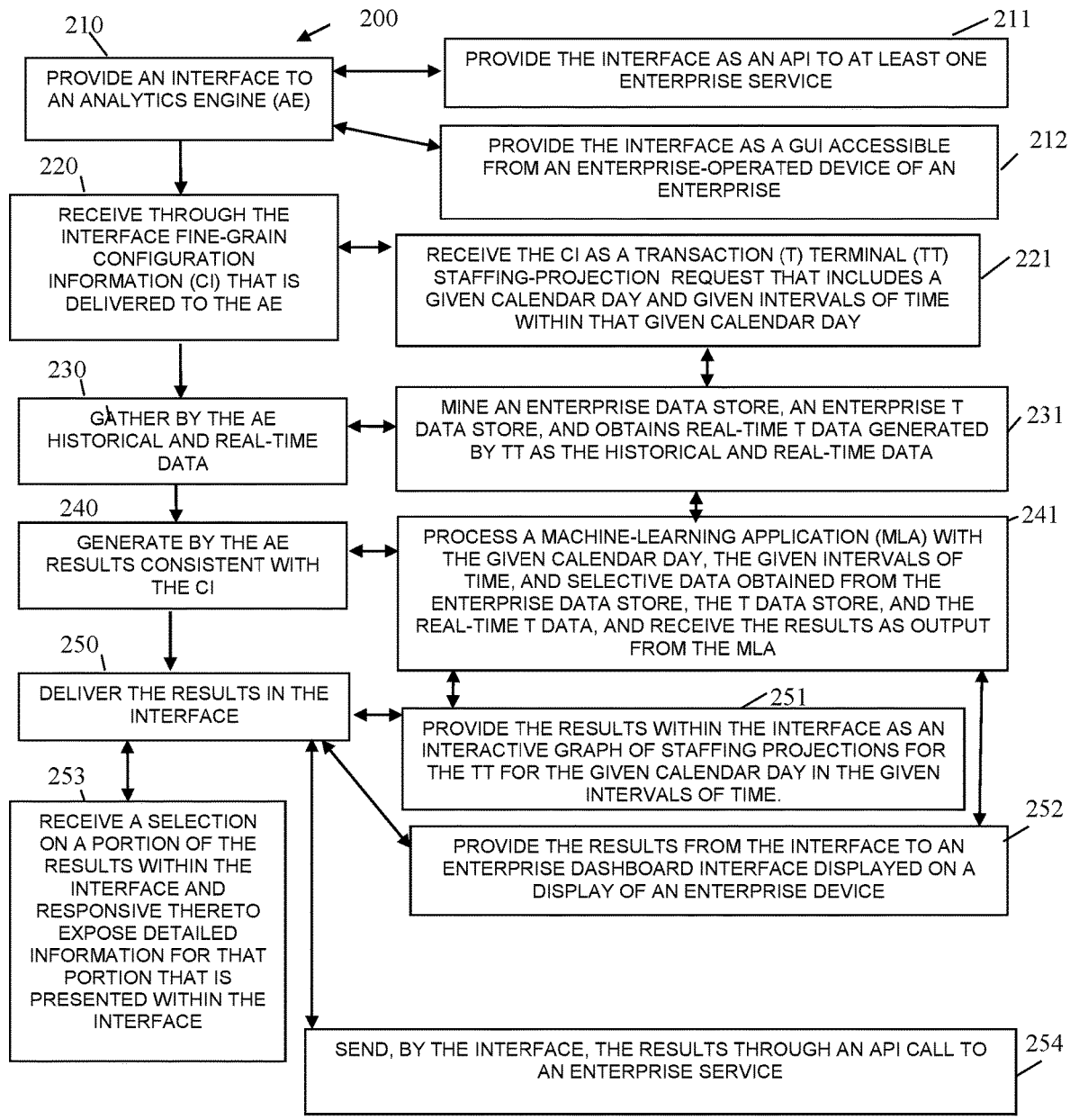
FIG. 2 is a diagram of a method for fine-grain analytics and interfaces, according to an example embodiment.

FIG. 2 is a diagram of a method 200 for fine-grain analytics and interfaces thereto, according to an example embodiment. The software module(s) that implements the method 200 is referred to as a "fine-grain projection manager." The fine-grain projection manager is implemented as executable instructions programmed and residing within memory and/or a non-transitory computer-readable (processor-readable) storage medium and executed by one or more processors of a device. The processor(s) of the device that executes the fine-grain projection manager are specifically configured and programmed to process the fine-grain projection manager. The fine-grain projection manager has access to one or more network connections during its processing. The network connections can be wired, wireless, or a combination of wired and wireless.

In an embodiment, the device that executes the fine-grain projection manager is a server. In an embodiment the device that executes the fine-grain projection manager is a cloud-based server. In an embodiment, the device that executes the fine-grain projection manager is one or more of the enterprise devices 121.

In an embodiment, the fine-grain projection manager is the real-time analytics manager 130 and the report/notification interface 131.

At 210, the fine-grain projection manager provides an interface to an analytics engine. In an embodiment, the analytics engine is the analytics engine 130 and the interface is the report/notification interface 131.

In an embodiment, at 211, the fine-grain projection manager provides the interface as an API to at least one enterprise service. In an embodiment, the at least one enterprise service is one of the enterprise services 121.

In an embodiment, at 212, the fine-grain projection manager provides the interface as a GUI accessible from an enterprise-operated device of an enterprise. In an embodiment, the enterprise-operated device is one of the enterprise-operated devices 122.

At 220, the fine-grain projection manager receives, through the interface, fine-grain configuration information that is delivered to the analytics engine as input criteria for processing by the analytics engine.

In an embodiment, at 221, the fine-grain projection manager receives the fine-grain configuration information as transaction terminal staffing projection request that includes a given calendar day and a given interval of time within that given calendar day.

At 230, the fine-grain projection manager gathers, by the analytics engine, historical and real-time data.

In an embodiment of 221 and 230, at 231, the fine-grain projection manager mines an enterprise data store, an enterprise transaction data store, and the fine-grain projection manager obtains real-time transaction data generated by transaction terminals as the historical and real-time data.

At 240, the fine-grain projection manager generates, by the analytics engine, results consistent with the fine-grain configuration information provided as input to the analytics engine.

In an embodiment of 231 and 240, at 241, the fine-grain projection manager processes a machine-learning algorithm with the given calendar day, the given interval of time, and selective data obtained from the enterprise data store, the transaction data store, and the real-time transaction data, and the fine-grain projection manager receives the results as output from the machine-learning algorithm.

At 250, the fine-grain projection manager delivers the results in the interface.

In an embodiment of 241 and 250, at 251, the fine-grain projection manager provides the results within the interface as an interactive graph of staffing projections for the transaction terminals for the given calendar day in the given intervals of time.

In an embodiment of 241 and 250, at 252, the fine-grain projection manager provides the results from the interface to an enterprise dashboard interface displayed on a display of an enterprise device.

In an embodiment, at 253, the fine-grain projection manager receives a selection on a portion of the results within the interface and responsive thereto the fine-grain projection manager exposes detailed information for that portion that is presented within the interface.

In an embodiment, at 254, the fine-grain projection manager sends, by the interface, the results through an API call to an enterprise service.

Figure 3:
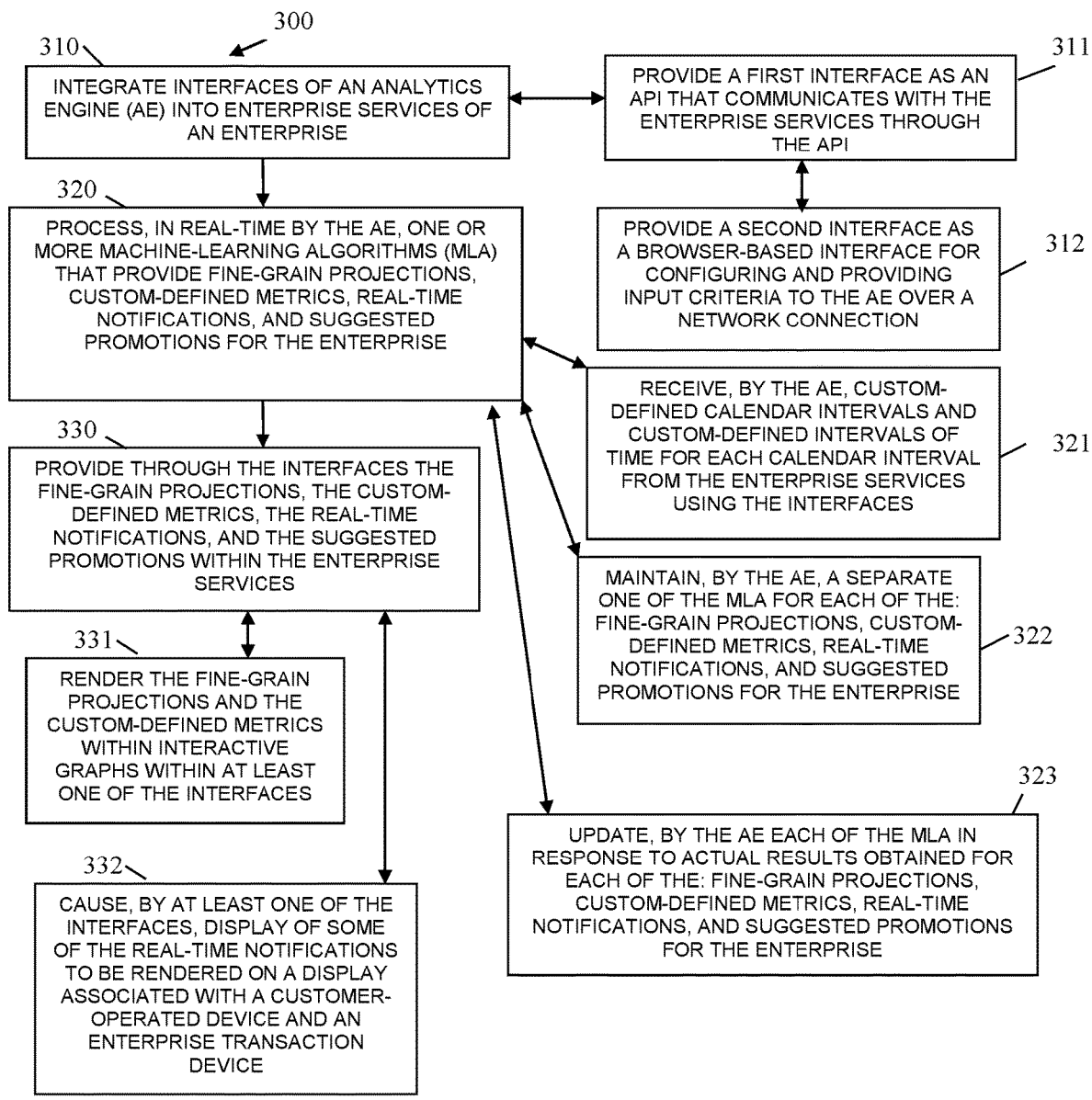
FIG. 3 is a diagram of another method for fine-grain analytics and interfaces, according to an example embodiment.

FIG. 3 is a diagram of another method 300 for fine-grain analytics and interfaces thereto, according to an example embodiment. The software module(s) that implements the method 300 is referred to as a "real-time analyzer." The real-time analyzer is implemented as executable instructions programmed and residing within memory and/or a non-transitory computer-readable (processor-readable) storage medium and executed by one or more processors of a device. The processors that execute the real-time analyzer are specifically configured and programmed to process the real-time analyzer. The real-time analyzer has access to one or more network connections during its processing. The network connections can be wired, wireless, or a combination of wired and wireless.

In an embodiment, the device that executes the real-time analyzer is a server. In an embodiment, the device that executes the real-time analyzer is a cloud-based server. In an embodiment, the device that executes the real-time analyzer is one or more of the enterprise devices 121.

In an embodiment, the real-time analyzer is all of or some combination of: the real-time analytics manager, the report/notification interface 131, and/or the method 200.

The real-time analyzer presents another and in some ways enhanced processing perspective of the method 200.

At 310, the real-time analyzer integrates interfaces of an analytics engine into enterprise services of an enterprise. In an embodiment, the analytics engine is the analytics engine 130, the interfaces are the report/notification interface 131, and the enterprise services is the enterprise services 122.

In an embodiment, at 311, the real-time analyzer provides a first interface as an API that communicates with the enterprises services through the API.

In an embodiment of 311 and at 312, the real-time analyzer provides a second interface as a browser-based interface for configuring and providing input criteria to the analytics engine over a network connection.

At 320, the real-time analyzer processes, in real time by the analytics engine, one or more machine-learning algorithms that provide fine-grain projections, custom-defined metrics, real-time notifications, and suggested promotions for the enterprise.

In an embodiment, at 321, the real-time analyzer receives, by the analytics engine, custom-defined calendar intervals and custom-defined intervals of time for each calendar interval from the enterprise services using the interfaces.

In an embodiment, at 322, the real-time analyzer maintains, by the analytics engine, a separate one of the machine-learning algorithms for each of the: fine-grain projections, custom-defined metrics, real-time notifications, and suggested promotions for the enterprise.

In an embodiment, at 323, the real-time analyzer updates, by the analytics engine, each of the machine-learning algorithms in response to actual results obtained for each of the: fine-grain projections, custom-defined metrics, real-time notifications, and suggested promotions for the enterprise. That is, the machine-learning algorithms are continually trained and updated for increased accuracy and precision based on the actual results for the enterprise.

At 330, the real-time analyzer provides through the interfaces the fine-grain projections, the custom-defined metrics, the real-time notifications, and the suggested promotions within the enterprise services.

In an embodiment, at 331, the real-time analyzer renders the fine-grain projections and the custom-defined metrics within interactive graphs within at least one of the interfaces.

In an embodiment, at 332, the real-time analyzer causes, by at least one of the interfaces, display of some of the real-time notifications to be rendered on a display associated with a customer-operated device and an enterprise transaction device. In an embodiment, the customer-operated device is the user-operated devices 110 and the enterprise transaction device is the transaction device 120.

Figure 4:
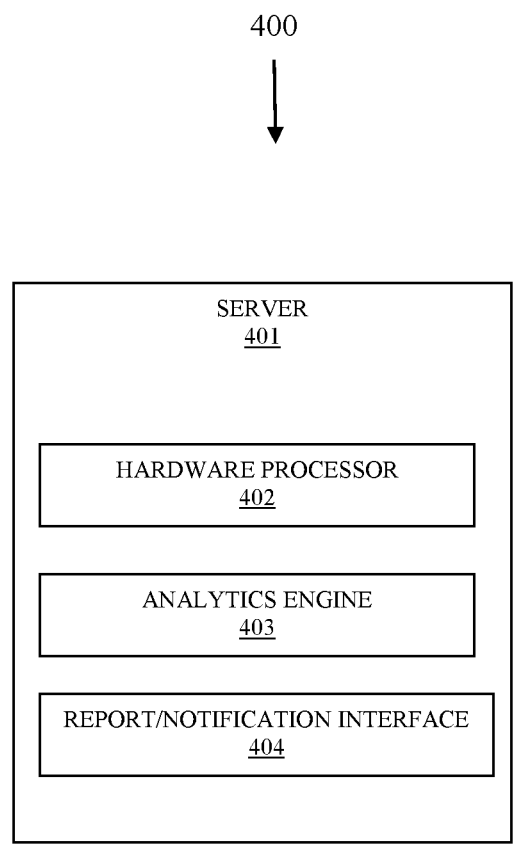
FIG. 4 is a diagram of a system for fine-grain analytics and interfaces, according to an example embodiment.

FIG. 4 is a diagram of a system 400 for fine-grain and real-time analytics and interface processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a server 401, at least one hardware processor 402, a real-time analytics engine 403, and a report/notification interface 404.

The real-time analytics engine 403 and the report/notification interface 404 are executable instructions that reside on a non-transitory computer-readable storage medium of the server 400 and that are executed by the at least one hardware processor 402.

In an embodiment, the real-time analytics engine 403 and the report/notification interface 404 are all of or some combination of: the real-time analytics engine 130, the report/notification interface 131, the method 200, and/or the method 300.

The real-time analytics engine 403 is configured to: i) execute on the at least one hardware processor 402 of the server 401, ii) maintain machine-learning algorithms to produce fine-grain projections, custom-defined metrics, real-time notifications, and suggested promotions for an enterprise, and iii) interact with the report/notification interface 404.

The report/notification interface 404 is configured to: i) execute on the at least one hardware processor 402 of the server 402, ii) receive customized input criteria from enterprise services of the enterprise, iii) deliver the customized input criteria to the analytics engine 403 as input to the machine learning algorithms, and iv) provide the fine-grain productions, custom-defined metrics, real-time notifications, and the suggested promotions produced as output from the machine-learning algorithms in displays associated with devices of the enterprise services.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions to a processor of a server from a non-transitory computer-readable storage medium causing the processor to perform operations comprising:
providing an interface to an analytics engine that executes on the processor of the server;
receiving through the interface fine-grain configuration information that is delivered to the analytics engine as input;
wherein the interface is a web-based interface accessible through a browser application on an enterprise device, wherein the configuration information at least includes a projected number of transaction terminals manned for a given day of operation and staffing projections in user-defined intervals;
wherein the transaction terminals are point-of-sale (POS) terminals operated by employees of an enterprise to checkout customers of the enterprise, wherein the POS terminals include displays and scanner for scanning item codes or checkout items;
gathering by the analytics engine historical and real-time data by mining an enterprise data store, an enterprise transaction data store, and obtaining real-time transaction data generated by transaction terminals as the historical and real-time data;
obtaining projected sales for a current year, current month, and current holiday schedule for the enterprise associated with the historical and real-time data;
wherein obtaining further includes adjusting the projected sales by processing linear regression on past sales and actual experienced sales over years of operation of the enterprise;
generating, by the analytics engine, results, consistent with the fine-grain configuration information, by processing a weighted regression algorithm to analyze the historical and real-time data with the projected sales as input and producing correlations as output relevant to the fine-grain configuration information;
wherein the results at least include a projected number of idle transaction terminals, the employees scheduled to work and available for the idle transaction terminals, a previous year's staffing for a corresponding interval of time, and previous transaction totals at the corresponding interval of time;
rendering the results within the interface with the correlations;
integrating the results within a dashboard widget into an existing interface associated with an existing enterprise service using a first application programming interface (API) causing the results to be presented on a display of the enterprise device through the dashboard widget of the existing interface;
iterating to the gathering for updated data associated with the real-time data;
identifying a priority-ordered list of items for any given calendar day based on the results; and
causing an adjustment in an inventory of a particular item in the priority-ordered list based on a trend revealed from the results to mitigate a scenario where the particular item is out of stock based on the trend.

2. The method of claim 1, wherein providing the interface further includes providing the interface via a second API to at least one additional existing enterprise service.

3. The method of claim 1, wherein providing the interface further includes providing the interface as a graphical user interface (GUI) accessible from an enterprise-operated device of the enterprise.

4. The method of claim 1, wherein receiving further includes receiving the fine-grain configuration information as a transaction terminal staffing projection request that includes the current day of the current year and a time interval associated with the given interval of time for the current day.

5. The method of claim 4, wherein generating further includes processing a machine-learning application for the current day by providing the time interval, the projected sales as adjusted, and the real-time data for the current day as input to the machine-learning application and receiving the results as output from the machine-learning application.

6. The method of claim 5, wherein rendering further includes providing the results within the interface as an interactive graph of staffing projections for the transaction terminals for the current day for each of the time intervals within the current day.

7. The method of claim 1, wherein rendering further includes receiving a selection on a portion of the results within the interface and responsive thereto exposing detailed information for that portion that is presented within the interface.

8. The method of claim 1, wherein rendering further includes sending, by the interface, the results through an API call to the existing enterprise service.

9. A method, comprising:
providing executable instructions to a processor of a server from a non-transitory computer-readable storage medium causing the processor to perform operations comprising;
integrating interfaces of an analytics engine into an existing enterprise service of an enterprise, wherein the analytics engine executes on the processor of the server using an application programming interface (AP);
wherein the analytics engine mines and maintains first correlations mined from enterprise data stores and enterprise transaction data stores based on configuration information provided through a web-based enterprise interface by the enterprise;
wherein the configuration information at least includes a projected number of transaction terminals manned for a given day of operation and staffing projections in user-defined intervals;
wherein the transaction terminals are point-of-sale (POS) terminals operated by employees of the enterprise to checkout customers of the enterprise, wherein the POS terminals include displays and scanner for scanning item codes or checkout items;
processing, in real-time by the analytics engine, one or more machine-learning algorithms that provide fine-grain projections, custom-defined metrics, real-time notifications, and suggested promotions for the enterprise by the analytics engine continuously updating the first correlations as historical and real-time enterprise data is processed by the analytics engine;
wherein the one or more machine-learning algorithms process a weighted regression algorithm on input data and produce as output correlations detected for the input data;
wherein the input data comprises the historical and real-time enterprise data and projected sales for a current year, a current month, and a current holiday schedule associated with the enterprise;
wherein projected sales are obtained and adjusted by processing linear regression on past sales and actual experienced sales over years of operation of the enterprise;
providing through the interfaces the fine-grain projections, the custom-defined metrics, the real-time notifications, the suggested promotions, and the correlations within the existing enterprise service using the API;
wherein providing further includes integrating the fine-grain projections, the custom-defined metrics, the real-time notifications, and the suggested promotions into a dashboard widget associated with the existing enterprise service causing the results to be presented on a display of an enterprise device through the dashboard widget of the existing interface;
wherein the fine-grain projections at least include a projected number of idle transaction terminals, the employees scheduled to work and available for the idle transaction terminals, a previous year's staffing for a corresponding interval of time, and previous transaction totals at the corresponding interval of time;
iterating back to the processing for updated data associated with the historical and real-time enterprise data;
identifying one or more days where a specific form of payment is used more frequently than other forms of payment based on the custom-defined metrics and the correlations; and
causing an adjustment in the suggested promotions on the one or more days within the enterprise at the transaction terminals to discourage the specific form of payment and encourage one or more of the other forms of payment.

10. The method of claim 9, wherein integrating further includes providing a first interface as a first API that communicates with the existing enterprise service through the first API.

11. The method of claim 10, wherein integrating further includes providing a second interface as a browser-based interface for configuring and providing input criteria to the analytics engine over a network connection.

12. The method of claim 9, wherein processing further includes receiving, by the analytics engine, custom-defined calendar intervals and a custom-defined time interval associated with the given interval of time from the existing enterprise service using the interfaces.

13. The method of claim 9, wherein processing further includes maintaining, by the analytics engine, a separate one of the machine-learning algorithms for each of the: fine-grain projections, custom-defined metrics, real-time notifications, and suggested promotions for the enterprise.

14. The method of claim 9, wherein processing further includes updating, by the analytics engine each of the machine-learning algorithms in response to actual results obtained for each of the: fine-grain projections, custom-defined metrics, real-time notifications, and suggested promotions for the enterprise.

15. The method of claim 9, wherein providing further includes rendering the fine-grain projections and the custom-defined metrics within interactive graphs within at least one of the interfaces.

16. The method of claim 9, wherein providing further includes causing, by at least one of the interfaces, display of some of the real-time notifications to be rendered on a display associated with a customer-operated device and an enterprise transaction device.

17. A system, comprising:
a server comprising hardware processor and a non-transitory computer-readable storage medium;
the non-transitory computer-readable medium comprising executable instructions for an analytics engine and a report/notification interface;
the analytics engine executed by the hardware processor causing the hardware processor to perform first operations comprising:
maintaining machine-learning algorithms to produce fine-grain projections, custom-defined metrics, real-time notifications, and suggested promotions for an enterprise by processing a weighted regression algorithm on input data and producing as output correlations detected for the input data based on at least configuration information obtained through a web-based interface;
wherein the configuration information at least includes a projected number of transaction terminals manned for a given day of operation and staffing projections in user-defined intervals;
wherein the transaction terminals are point-of-sale (POS) terminals operated by employees of the enterprise to checkout customers of the enterprise;
wherein the POS terminals include displays and scanner for scanning item codes or checkout items;
wherein the input data comprises historical and real-time enterprise data and projected sales of the enterprise for a current year, a current month, and a current holiday schedule;
wherein projected sales are obtained and adjusted by processing linear regression on past sales and actual experienced sales over years of operation of the enterprise;
wherein the fine-grain projections at least include a projected number of idle transaction terminals, employees scheduled to work and available for the idle transaction terminals, a previous year's staffing for a corresponding interval of time, and previous transaction totals at the corresponding interval of time;
interacting with the report/notification interface to provide the correlations;
iterating to the maintaining for updated data associated with the real-time enterprise data;
identifying a priority-ordered list of items for any given calendar day based on the correlations, and
causing an adjustment in an inventory a particular item in the priority-ordered list based on a trend revealed from results to mitigate a scenario where the particular item is out of stock based on the trend; and
the report/notification interface executed by the hardware processor causing the hardware processor to perform second operations comprising:
receiving customized input criteria from an existing enterprise service of the enterprise through an application programming interface (API);
delivering the customized input criteria to the analytics engine as input to the machine learning algorithms; and
providing the fine-grain projections, custom-defined metrics, real-time notifications, and the suggested promotions produced as output from the machine-learning algorithms in displays associated with devices of the existing enterprise service;
wherein providing further includes integrating the fine-grain projections, the custom-defined metrics, the real-time notifications, and the suggested promotions into a dashboard widget of the existing enterprise service using the API causing the fine grain projections, the custom-defined metrics, the real-time notifications, and the suggested promotions to be presented on a display of an enterprise device through the dashboard widget of the existing service.

18. The system of claim 17, wherein the server is one of: a cloud-based server and an enterprise-controlled server.

* * * * *